(12) United States Patent
Kohli (10) Patent No.: US 10,687,668 B2
(45) Date of Patent: Jun. 23, 2020

(54) RACK SYSTEM FOR A GRILL

(71) Applicant: Ashish Kohli, Atlanta, GA (US)

(72) Inventor: Ashish Kohli, Atlanta, GA (US)

( * ) Notice: Subject to any disclaimer, the term of this patent is extended or adjusted under 35 U.S.C. 154(b) by 69 days.

(21) Appl. No.: 16/109,352

(22) Filed: Aug. 22, 2018

(65) Prior Publication Data

US 2019/0059652 A1 Feb. 28, 2019

Related U.S. Application Data

(60) Provisional application No. 62/548,704, filed on Aug. 22, 2017.

(51) Int. Cl.
*A47J 37/07* (2006.01)

(52) U.S. Cl.
CPC ....... *A47J 37/0786* (2013.01); *A47J 37/0704* (2013.01); *A47J 37/0718* (2013.01); *A47J 2037/0795* (2013.01)

(58) Field of Classification Search
CPC ............... A47J 37/0718; A47J 37/0786; A47J 37/0704; A47J 2037/0795; A47J 37/0763; A47J 7/1418
See application file for complete search history.

(56) References Cited

U.S. PATENT DOCUMENTS

| | | | | |
|---|---|---|---|---|
| 4,450,827 | A * | 5/1984 | Love | F24B 1/193 126/298 |
| 9,504,353 | B1 * | 11/2016 | Benson | A47J 37/079 |
| 2014/0034792 | A1 * | 2/2014 | Ashpole | A47C 4/20 248/166 |
| 2018/0180286 | A1 * | 6/2018 | Brennan | F23L 1/02 |

* cited by examiner

*Primary Examiner* — Alfred Basichas
(74) *Attorney, Agent, or Firm* — Nelson Mullins Riley & Scarborough LLP (57) ABSTRACT

A stackable rack system for a grill including a firebox, having a first base rack including a plurality of support posts, each support post including a vertical portion having a lower end and an upper end, the lower end being adjacent an upper surface of the firebox, and a support tab that is pivotably mounted to the upper end of the vertical portion, wherein each support tab is configured to be foldable between an in-use position in which the support tab is horizontal and extends radially-inwardly from the corresponding support post, and a stored position in which the support tab is disposed radially-outwardly of the corresponding support post.

7 Claims, 12 Drawing Sheets

RACK SYSTEM FOR A GRILL

CLAIMS OF PRIORITY

This application claims priority to U.S. Provisional Application Ser. No. 62/548,704, filed Aug. 22, 2017, the entire disclosure of which is incorporated by reference herein.

FIELD OF THE INVENTION

The present invention relates generally to grills and smokers. More particularly, the present invention relates to a stackable rack system for use with an outdoor grill or smoker.

BACKGROUND OF THE INVENTION

The popularity of Kamado style grills has increased greatly in recent years. The thick ceramic walls of these grills improve temperature control and the retention of heat within the grill. As such, a typical user is able to perform many types of food preparation with a grill that have traditionally not been effective with standard metal bodied grills. For example, the improved temperature control afforded by Kamado grills makes it much easier to maintain temperature within a desired range to smoke meats for hours, bake food items at the proper temperature, etc. In addition to maximizing the interior volume of the grill during food preparation, it is also desirable to prepare various foods at different positions within the grill. For example, for some food items it may be desirable to be closer to the heat source, whereas for other food items it is preferable to be farther away from the heat source. As well, it is desirable to be able to utilize different cooking surfaces (grate, stone, etc.) for different food items. For example, for some food items direct heat is desired, whereas for other items indirect heat is necessary.

The present invention recognizes and addresses considerations of prior art constructions and methods.

SUMMARY OF THE INVENTION

One embodiment of the present disclosure provides a stackable rack system for a grill including a firebox, having a first base rack including a plurality of support posts, each support post including a vertical portion having a lower end and an upper end, the lower end being adjacent an upper surface of the firebox, and a support tab that is pivotably mounted to the upper end of the vertical portion. Each support tab is configured to be foldable between an in-use position in which the support tab is horizontal and extends radially-inwardly from the corresponding support post, and a stored position in which the support tab is disposed radially-outwardly of the corresponding support post.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
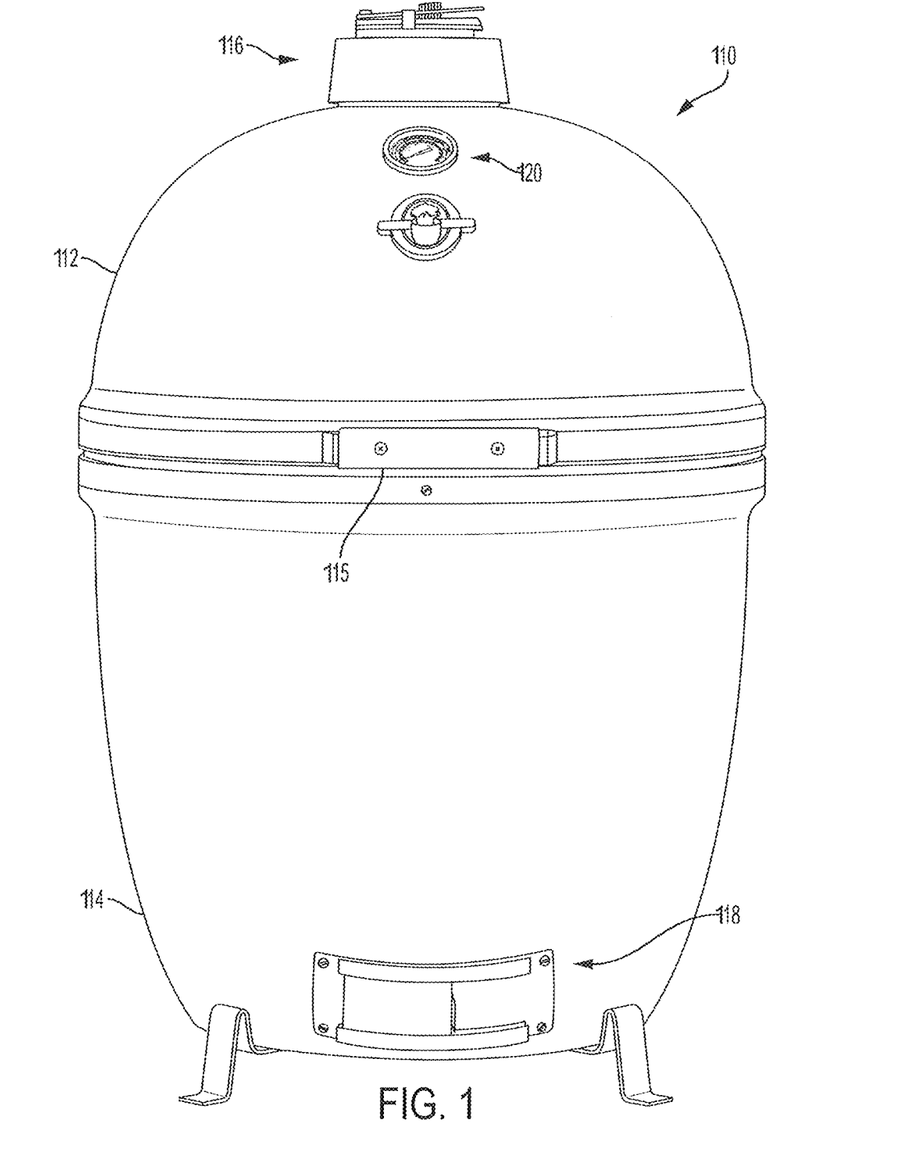
FIG. 1 is a front view of a grill/smoker including a stackable rack system in accordance with an embodiment of the present disclosure.
Figure 2:
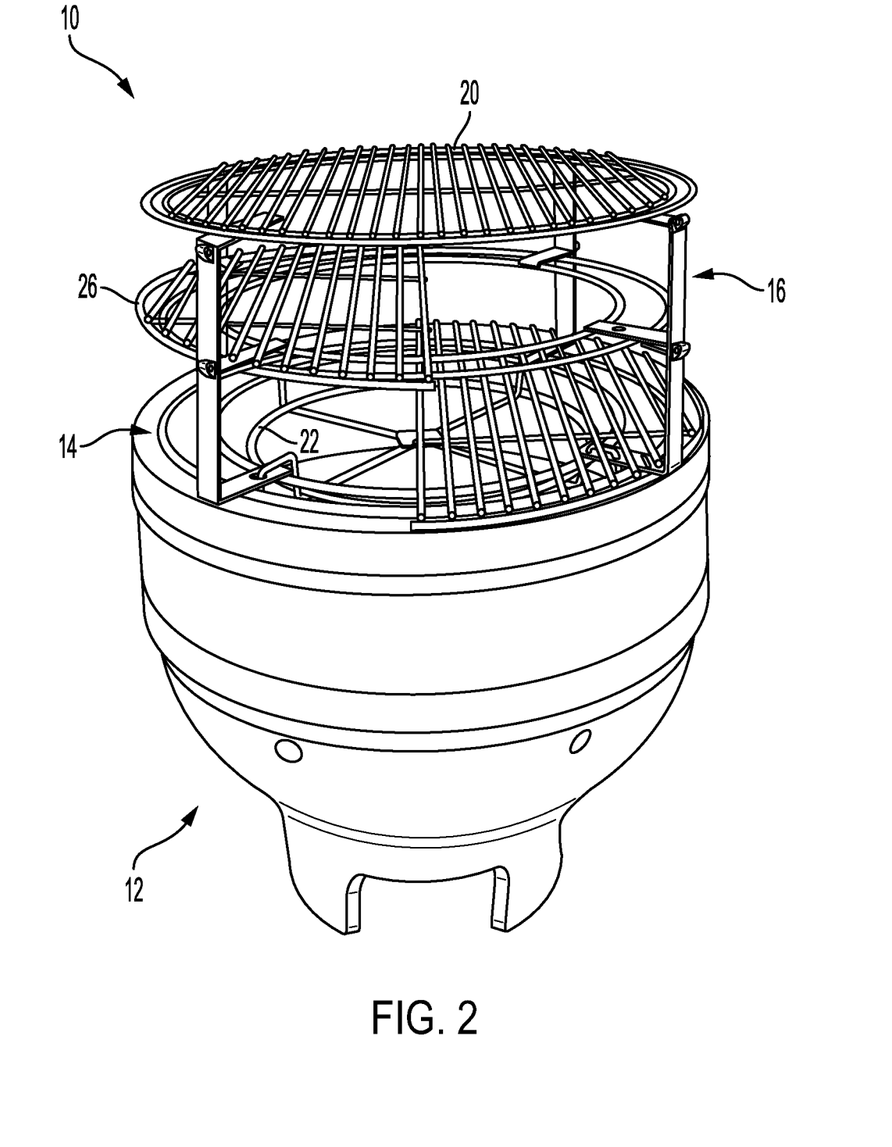
FIG. 2 is a perspective view of a stackable rack system in accordance with an embodiment of the present invention.

Referring now to the FIGS. 1 and 2, an embodiment of a stackable cooking rack system 10 in accordance with the present invention is shown mounted in a grill 110. Preferably, grill 110 is a Kamado-style grill and includes a top housing portion 112 and a bottom housing portion 114 that both include thick ceramic walls. Note, however, rack system 10 may be used with all types of grills, smokers, etc. A first damper 116 and a second damper 118 are provided on top housing portion 112 and bottom housing portion 114 of grill 110, respectively, to control air flow through the interior of the grill, thereby allowing the interior temperature to be adjusted. Top housing portion 112 is pivotably connected to bottom housing portion 114 by a hinge (not shown), and a handle 115 is provided so that top housing portion 12 may be opened and closed.

Referring specifically to FIG. 2, the disclosed rack system 10 includes various components that allow for different cooking configurations within the grill. For example, as shown, one or more stackable base racks 14 may be used to support cooking components such as, but not limited to, a full grilling grate 20, a half grilling grate 26, a rack descender 22, etc. As shown, the rack system 10 preferably rests on an upper edge of the grill's firebox 12 on a base rack 14.

Figure 3A:
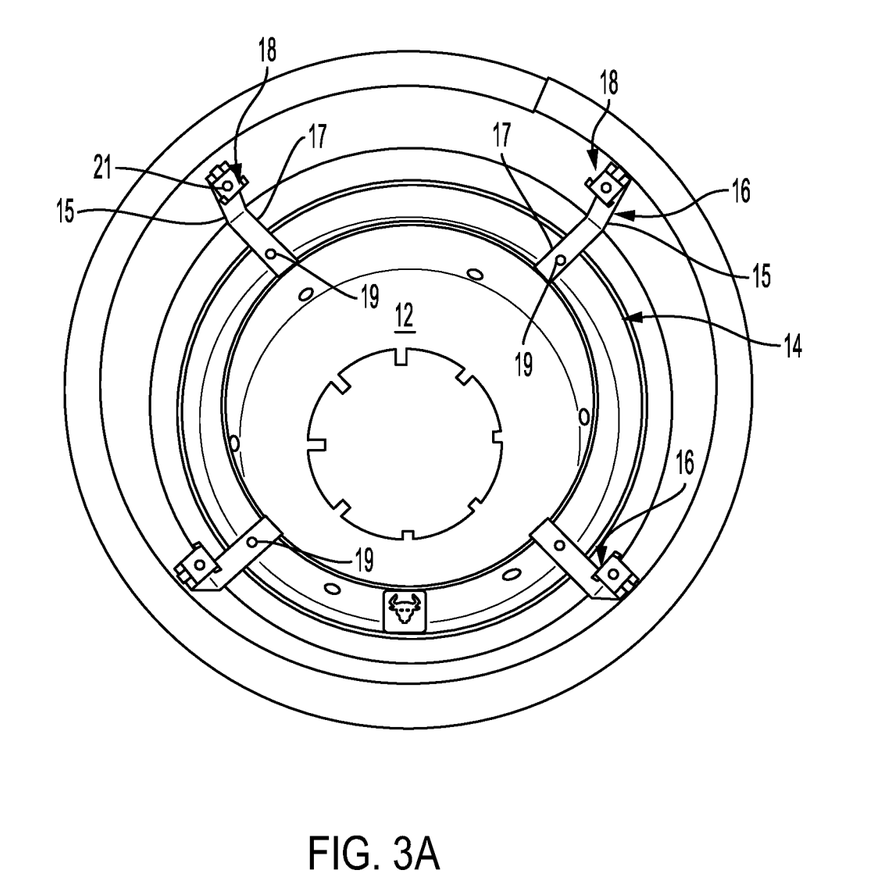
FIGS. 3A through 3F are various views of the stackable rack system shown in FIG. 2 in various cooking configurations.
Figure 3B:
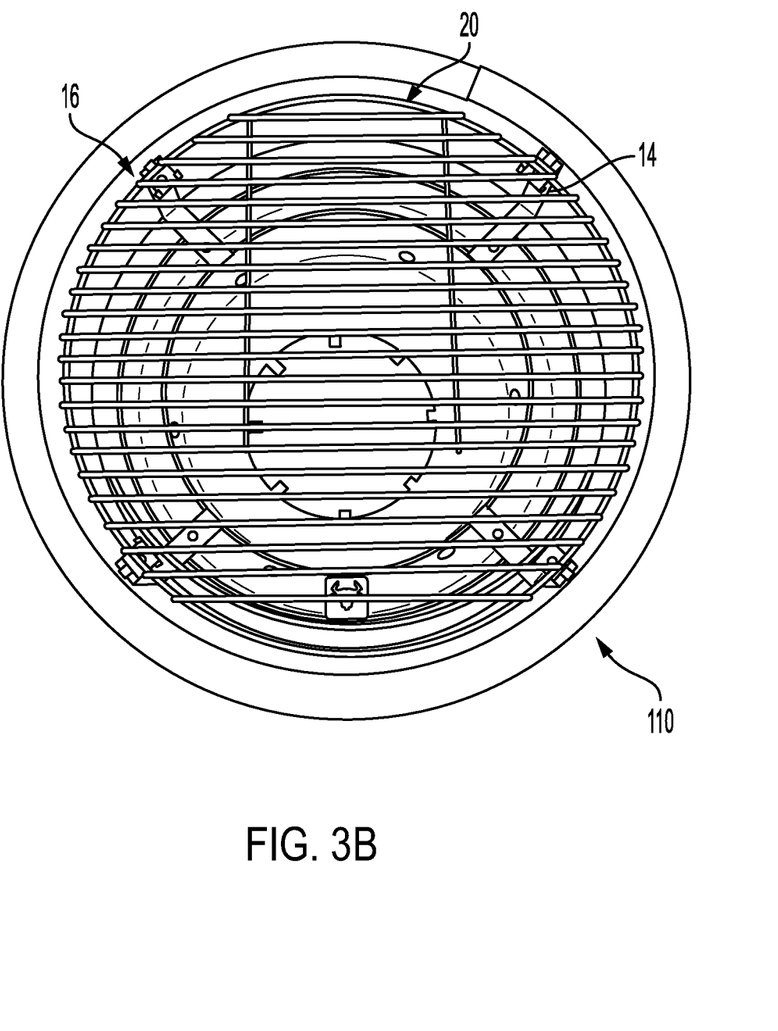
Figure 6A:
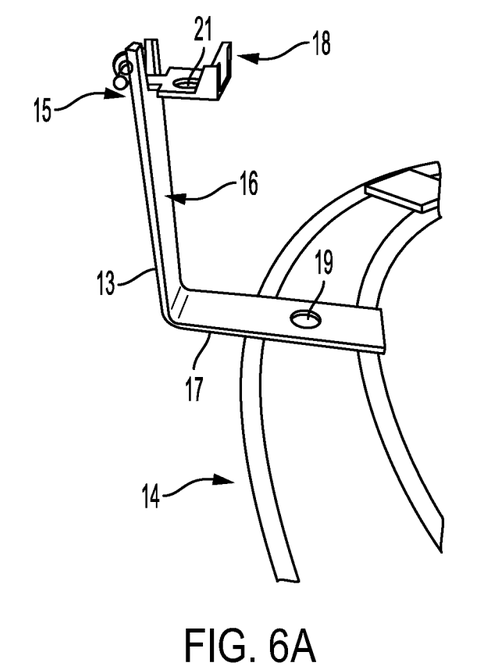
FIGS. 6A and 6B are partial perspective views of a base rack of the rack system shown in FIG. 2.
Figure 6B:
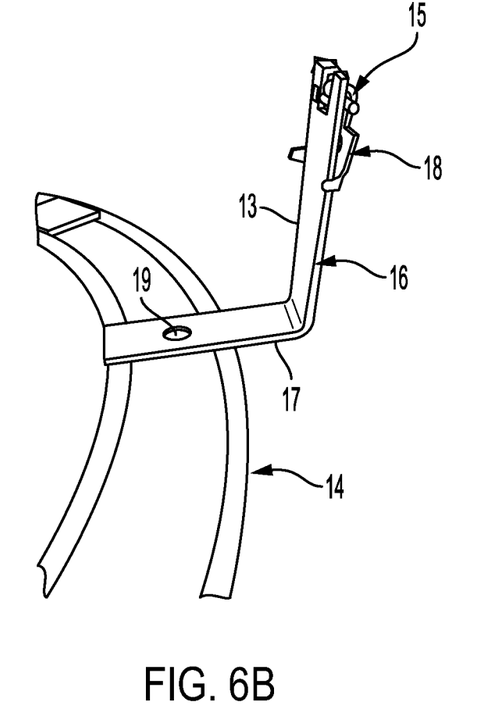

As shown in FIG. 3A, the base rack 14 rests on the upper edge of the firebox 12. The base rack 14 includes a plurality of support posts 16, each post 16 including a horizontal portion 17 defining an aperture 19, a vertical portion 13 extending upwardly from the horizontal portion, and a "foldable" support tab 18 at the upper end of the vertical portion 13. Foldable support tab is connected to the upper end of the vertical portion 13 by a hinge 15. As such, when another component is to be supported on the support posts 16, the support tabs 18 are folded inwardly, as shown in FIG. 6A. When another component is not to be used, the support tabs 18 can be folded into the "non-use" position, as shown in FIG. 6B. Each support tab 18 also defines an aperture 21 for supporting various cooking components, as discussed in greater detail below. As shown in FIG. 3B, the base rack 14 is shown supporting a full grilling grate 20.

Figure 3C:
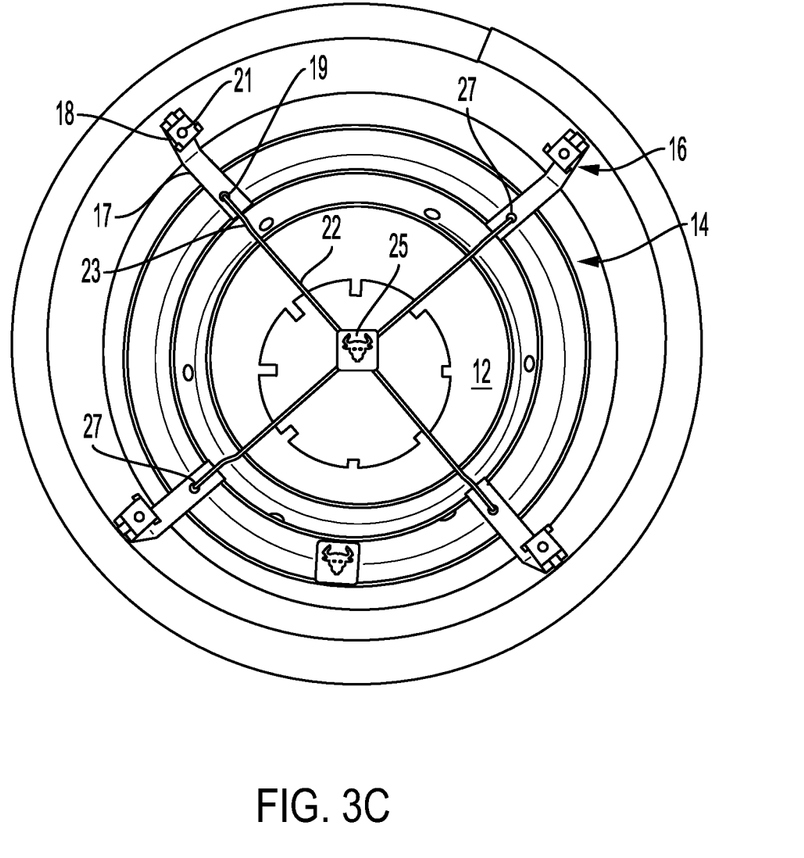
Figure 3D:
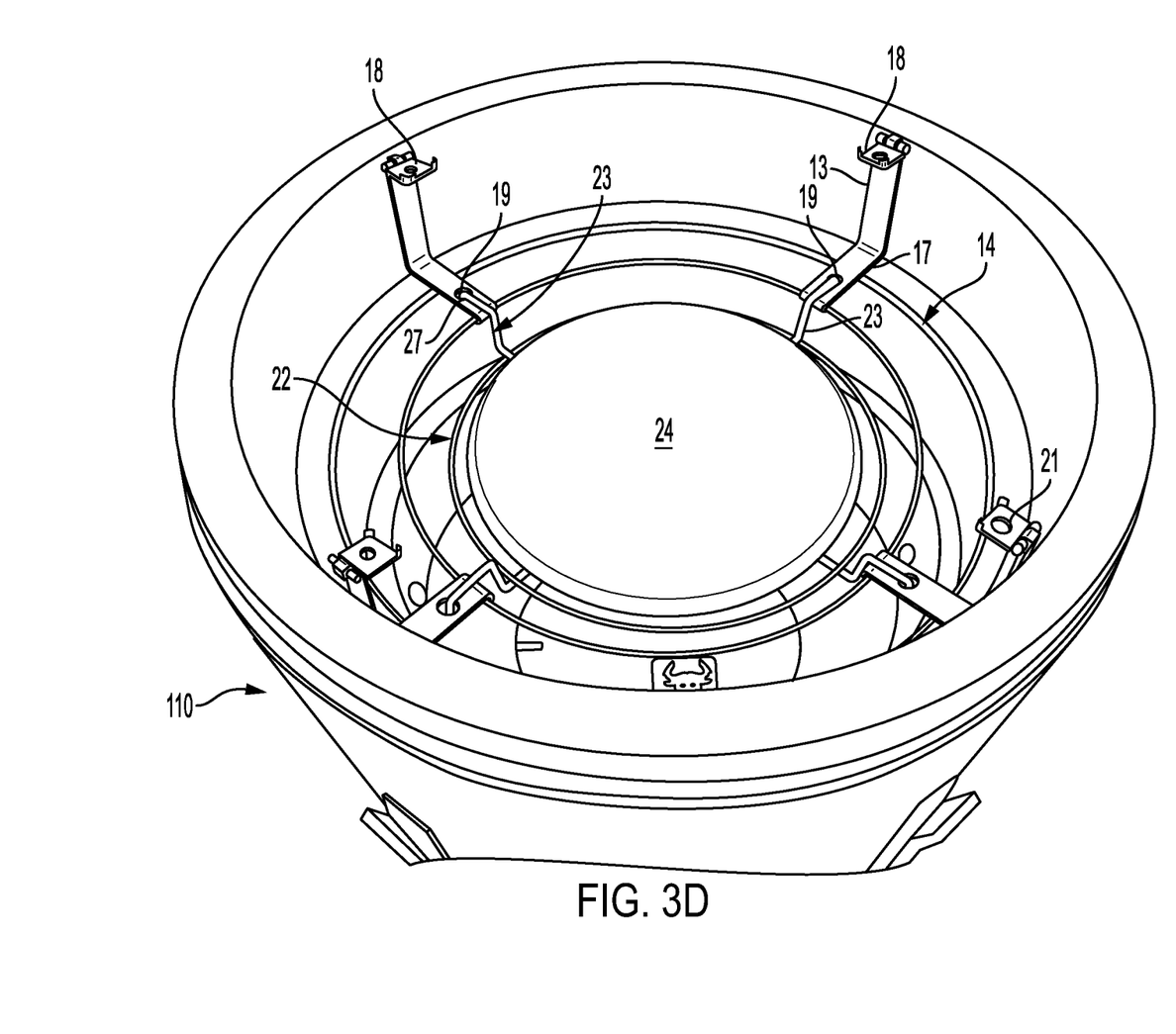

As shown in FIGS. 3C and 3D, the base rack 14 is shown supporting a rack descender 22. Preferably, the rack descender 22 includes a pair of connected cross members, each member defining a downwardly depending leg 23 at each end. As well, each leg 23 includes a downwardly depending distal end portion 27 that is configured to be received in the aperture 19 formed in the horizontal portion 17 of a corresponding support post 16 of the base rack 14. As such, rack descender 22 can support items, such as a cooking stone 24 (FIG. 3D), on its central portion 25 which is below the level of the base rack 14. As such, food items supported on the rack descender 22 can be positioned closer to the heat source.

Figure 3E:
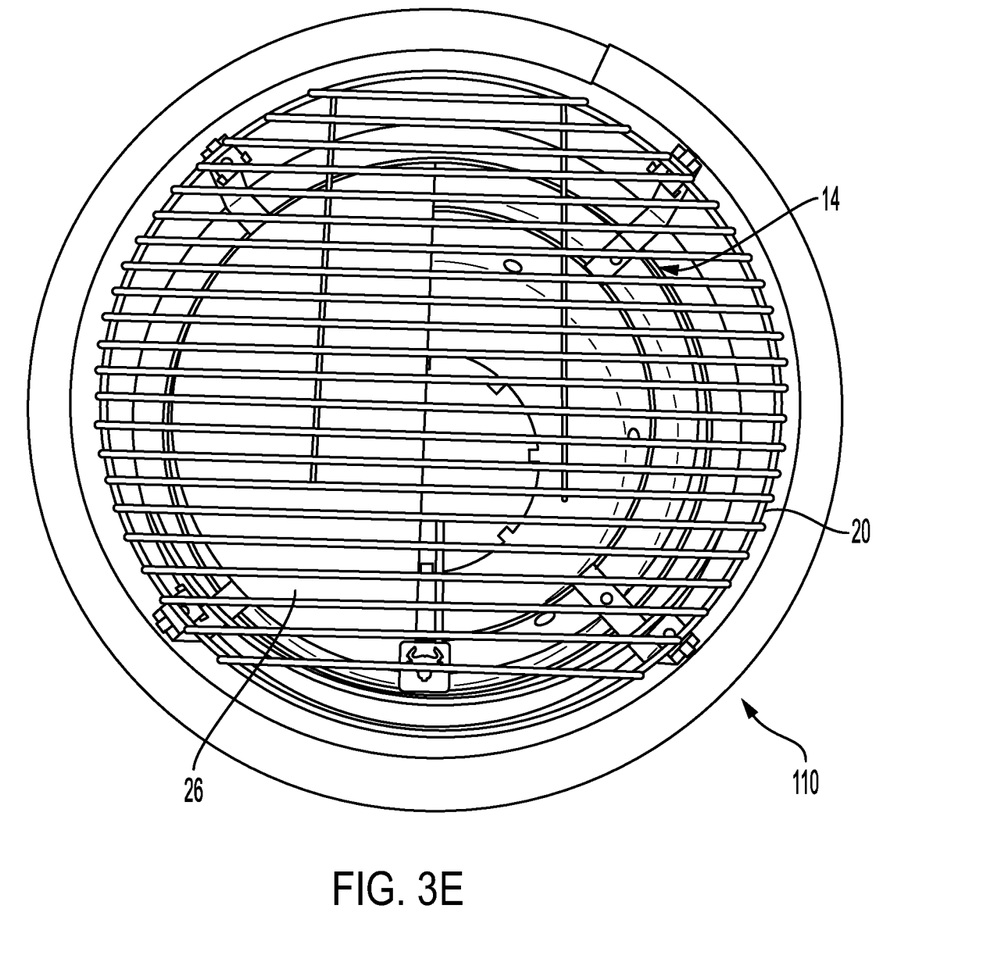
Figure 3F:
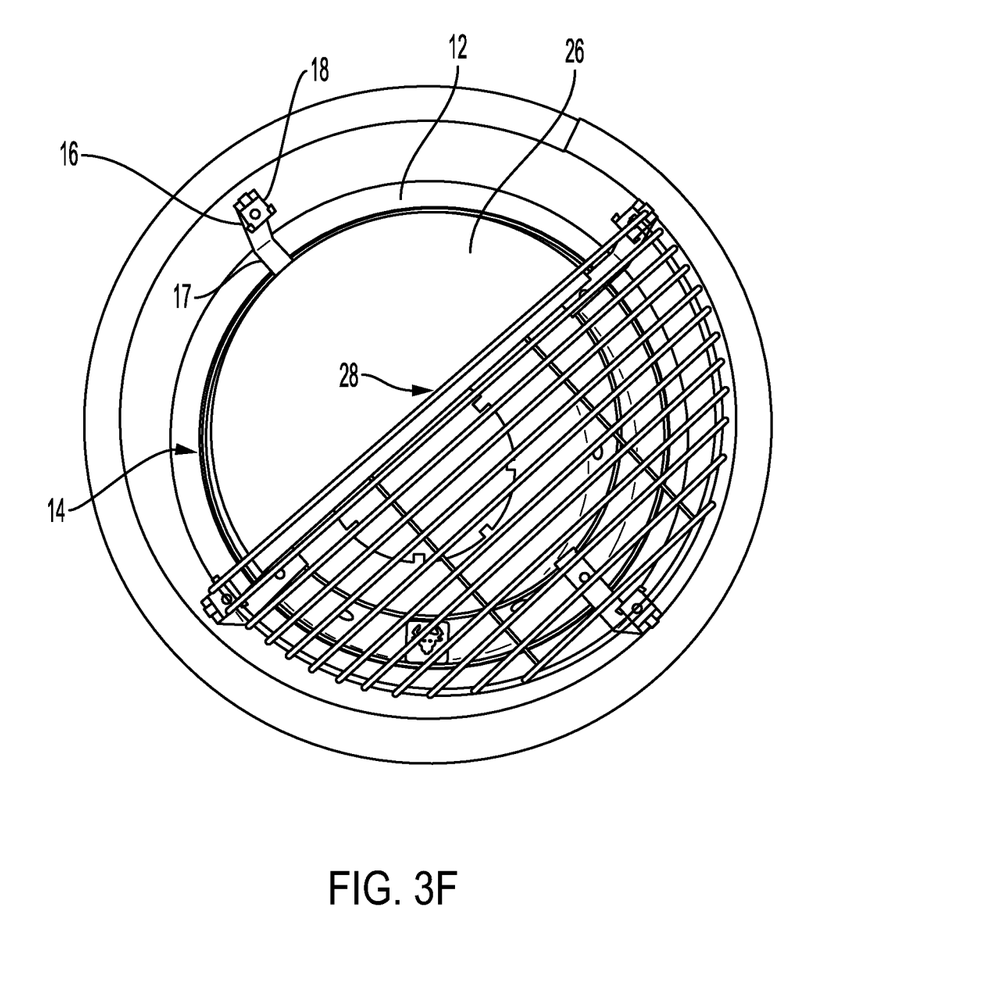

As shown in FIG. 3E, the base rack 14 is supporting both a half cooking stone 26 and a full grilling grate 20, whereas FIG. 3F shows the base rack 14 supporting both the half cooking stone 26 and a half grilling grate 28. Numerous configurations are possible, such as the base rack 14 directly supporting both a half cooking stone 26 and a half grilling grate 28 on its horizontal portions 17, and supporting a full grilling grate 20 by way of its support posts 16 and support tabs 18 disposed at the upper ends thereof.

Figure 4A:
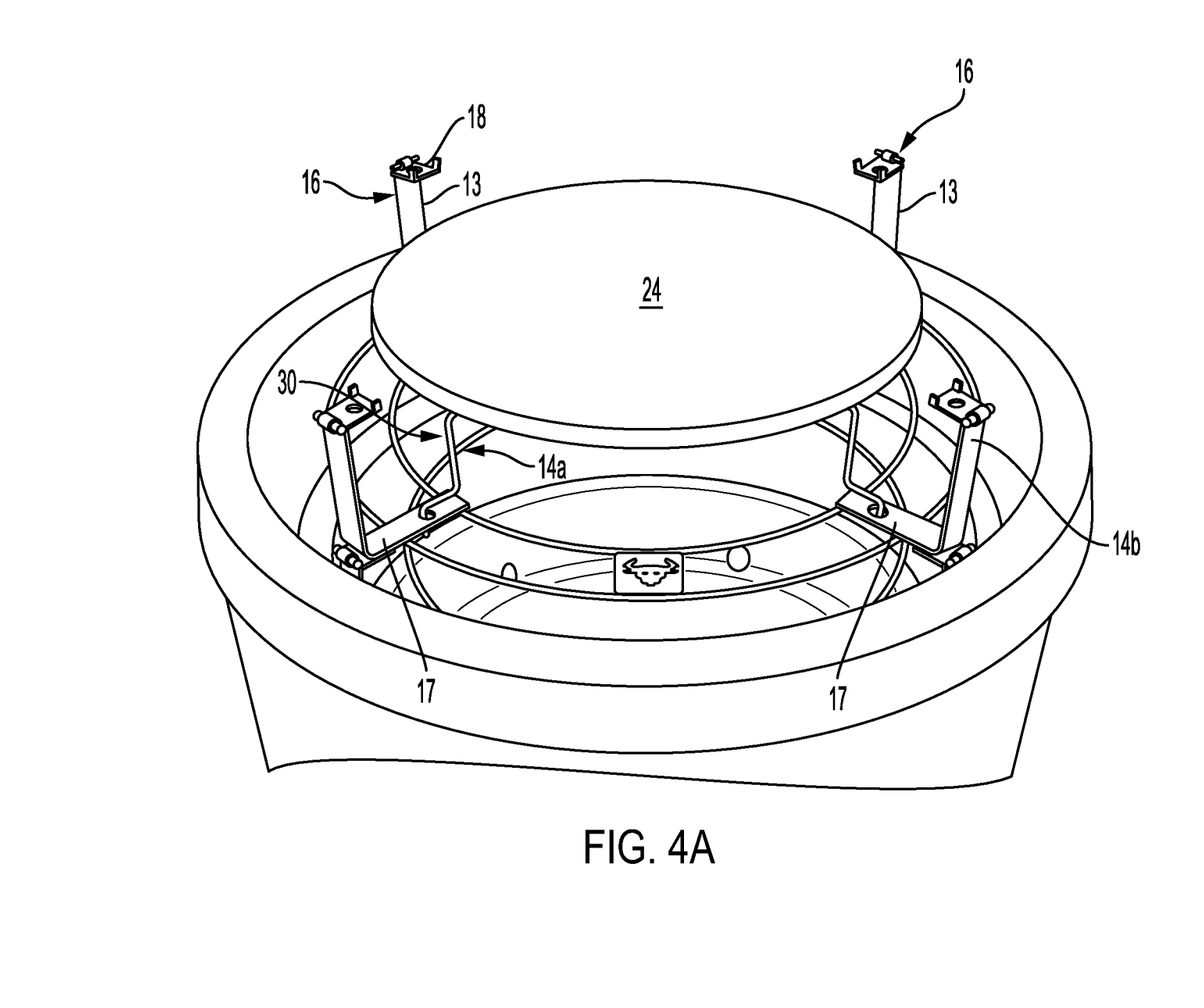
FIGS. 4A and 4B are perspective views of an alternate embodiment of the stackable rack system shown in FIG. 2.
Figure 4B:
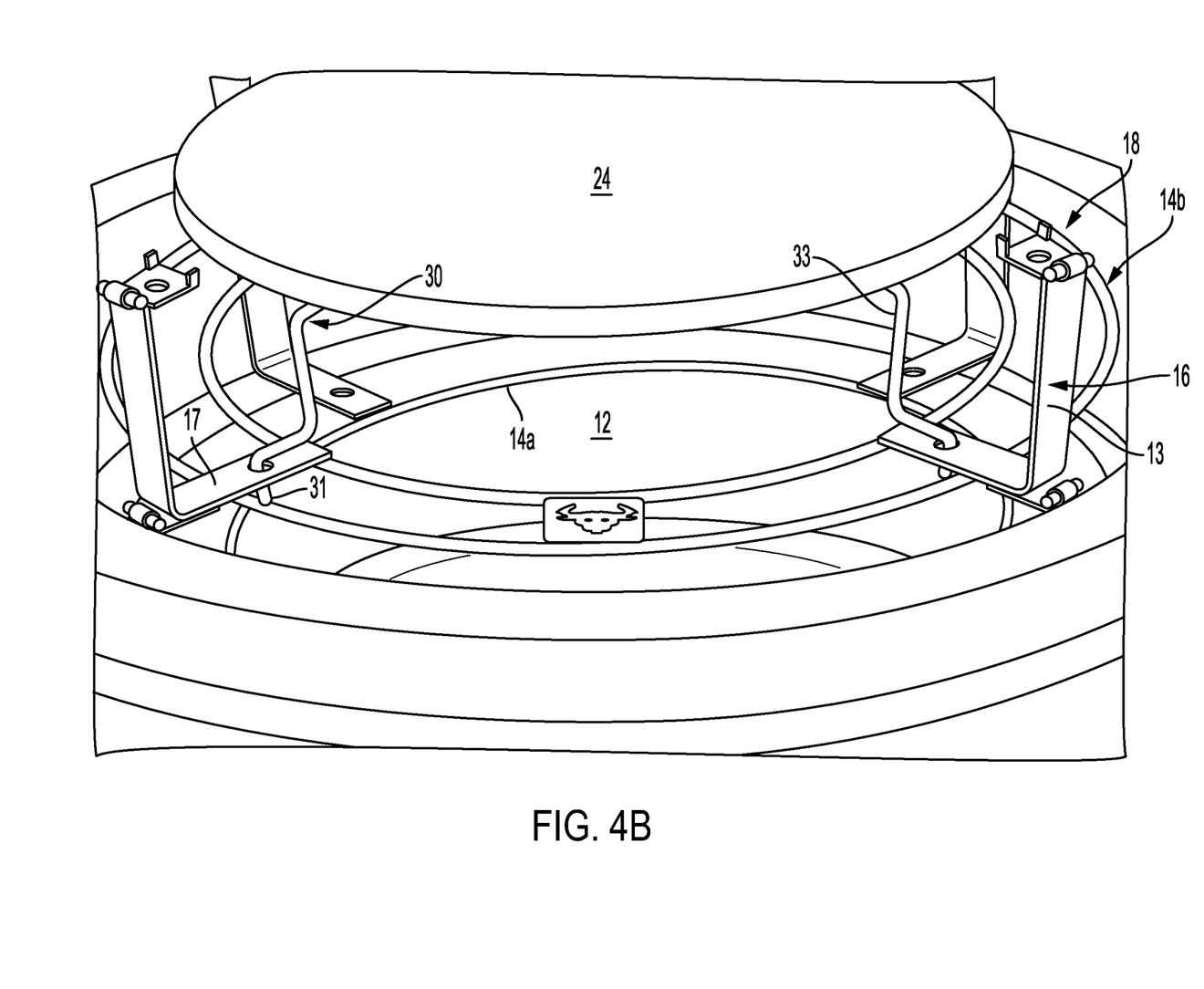

As shown in FIGS. 4A and 4B, a first base rack 14a supports a second base rack 14b, which in turn supports a rack ascender 30 on which a cooking stone 24 is supported. Preferably, rack ascender 30 includes a pair of connected cross members, each member defining an upwardly depending leg 33 at each end. As well, each leg 33 includes a downwardly depending distal end portion 31 that is configured to be received in the aperture 19 formed in the horizontal portion of a corresponding support post 16 of the base rack 14. As such, rack ascender 30 can support items, such as a cooking stone 24 (FIG. 4B), on its central portion (not shown) which is above the level of the base rack 14. As such, food items supported on the rack ascender 30 can be positioned further away from the heat source.

Figure 5:
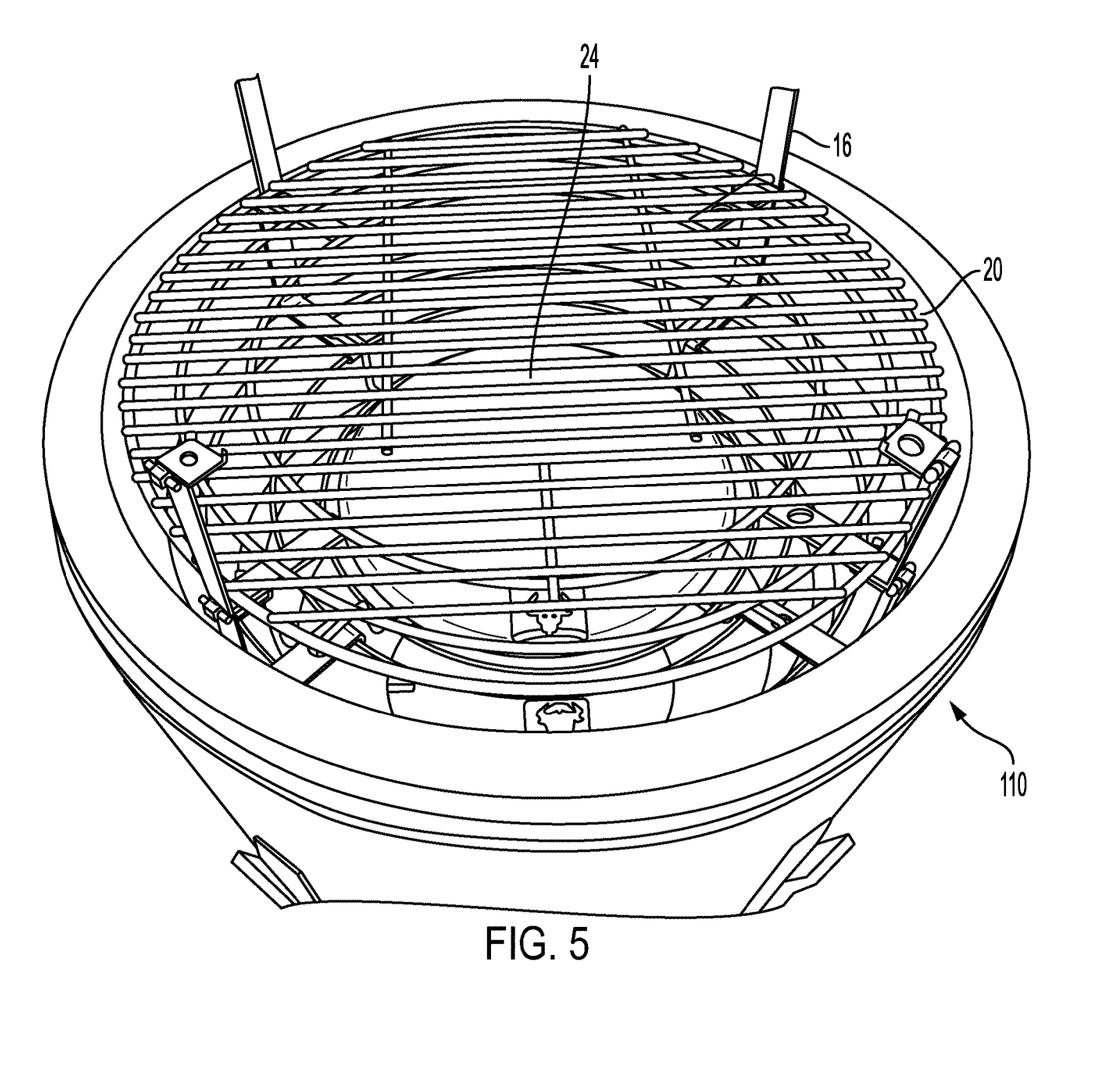
FIG. 5 is a perspective view of an alternate embodiment of the stackable rack system shown in FIG. 2.

As shown in FIG. 5, a first base rack 14a supports a rack descender 22 and a cooking stone 24, as well as a second base rack 14b. The second base rack supports a full grilling grate 20. As such, numerous differing food items may be prepared simultaneously within the grill 110.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A stackable rack system for a grill including a firebox, comprising:
    a first base rack including a plurality of support posts, each support post including a vertical portion having a lower end and an upper end, the lower end being adjacent an upper surface of the firebox, and a support tab that is pivotably mounted to the upper end of the vertical portion,
    wherein each support tab is configured to be foldable between an in-use position in which the support tab is horizontal and extends radially-inwardly from the corresponding support post, and a stored position in which the support tab is disposed radially-outwardly of the corresponding support post.

2. The stackable rack system of claim 1, wherein each support post of the first base rack further includes a horizontal portion extending radially-inwardly from the lower end of the vertical portion of the corresponding support post, and each horizontal portion abuts the upper surface of the firebox.

3. The stackable rack system of claim 2, wherein each of the support posts is affixed to a pair of concentric rings.

4. The stackable rack system of claim 2, wherein each support tab and each horizontal portion of each support post defines an aperture configured to slidably receive a portion of a cooking component.

5. The stackable rack system of claim 2, wherein each support tab of each support post is pivotably secured to the vertical portion by a hinge.

6. The stackable rack system of claim 2, further comprising a grilling grate that is supported by the support tabs of the plurality of support posts.

7. The stackable rack system of claim 2, further comprising a second base rack including a plurality of support posts, each support post including a vertical portion having a lower and an upper end, a support tab that is pivotably mounted to the upper end of the vertical portion, and a horizontal portion that depends radially-inwardly from the lower end of the vertical portion, wherein the horizontal portions of the support posts of the second base rack abut the support tabs of the support posts of the first base ract.

* * * * *

UNITED STATES PATENT AND TRADEMARK OFFICE
CERTIFICATE OF CORRECTION

PATENT NO. : 10,687,668 B2  
APPLICATION NO. : 16/109352  
DATED : June 23, 2020  
INVENTOR(S) : Ashish Kohli Page 1 of 1

It is certified that error appears in the above-identified patent and that said Letters Patent is hereby corrected as shown below:

In the Claims

In Column 4, Line 50, Claim 7, please change "ract" to --rack--.

Signed and Sealed this  
Fifteenth Day of December, 2020

Andrei Iancu  
*Director of the United States Patent and Trademark Office*